(12) United States Patent
Kato et al.

(10) Patent No.: US 7,744,116 B2
(45) Date of Patent: Jun. 29, 2010

(54) AIRBAG SYSTEM FOR A MOTORCYCLE, AND MOTORCYCLE INCORPORATING SAME

(75) Inventors: Yuichi Kato, Saitama (JP); Hiroshi Goto, Saitama (JP); Takeshi Kuroe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 11/903,925

(22) Filed: Sep. 25, 2007

(65) Prior Publication Data
US 2008/0079244 A1  Apr. 3, 2008

(30) Foreign Application Priority Data
Sep. 29, 2006  (JP)  .............................. 2006-269331

(51) Int. Cl.
B60R 21/20 (2006.01)
(52) U.S. Cl. .............. 280/730.1; 280/728.1; 280/728.2; 180/219
(58) Field of Classification Search .............. 280/730.1, 280/728.1, 743.1, 728.2, 728.3; 180/219
See application file for complete search history.

(56) References Cited

U.S. PATENT DOCUMENTS

| 5,308,111 | A | * | 5/1994 | Sommer | ................... | 280/728.3 |
| 5,372,379 | A | * | 12/1994 | Parker | ..................... | 280/728.3 |
| 6,250,669 | B1 | * | 6/2001 | Ohmiya | ...................... | 280/732 |
| 6,835,439 | B1 | * | 12/2004 | Kondo et al. | ................ | 428/156 |
| 7,255,363 | B2 | * | 8/2007 | Horiuchi | ................... | 280/728.3 |
| 7,497,464 | B2 | * | 3/2009 | Horiuchi et al. | .......... | 280/730.1 |
| 7,556,283 | B2 | * | 7/2009 | Horiuchi et al. | .......... | 280/728.2 |
| 2007/0063491 | A1 | * | 3/2007 | Horiuchi et al. | .......... | 280/728.2 |

FOREIGN PATENT DOCUMENTS

| EP | 1 342 653 | 9/2003 |
| FR | 2 761 940 A | 10/1998 |
| JP | 2002-137779 | 5/2002 |
| JP | 2003-327182 | 11/2003 |

OTHER PUBLICATIONS

Yamaguchi, J, "Motorcycle Incorporates Airbag System", Automotive Engineering International, SAE International, Warrendale, PA, US, vol. 108, No. 6, Jun. 2000, p. 46.

* cited by examiner

*Primary Examiner*—Ruth Ilan
*Assistant Examiner*—Nicole Verley
(74) *Attorney, Agent, or Firm*—Carrier, Blackman & Associates P.C.; Joseph P. Carrier; William D. Blackman (57) ABSTRACT

An airbag system includes belt support members for housing support belts used for coupling an airbag to a vehicle body, and belt covers disposed over the belt support members. A central cover panel on the vehicle body is adjacent to an airbag module in which an airbag is accommodated. Left and right cover panels are engaged with, and disposed laterally outside of the central cover panel in the vehicle-width direction. The belt support members are configured by overhanging parts of the central cover panel, which are overhung laterally outside, and extension parts of the cover panels and which extend laterally inside; and both of these components are engaged with each other through engaging portions in the belt support members. Notches are provided in the extension parts, extending in a longitudinal direction of the vehicle body outside in the vehicle-width direction relative to the engaging portions.

15 Claims, 5 Drawing Sheets

AIRBAG SYSTEM FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2006-269331, filed on Sep. 29, 2006. The subject matter of this priority document is incorporated by reference herein.

BACKGROUND OF THE INVENTION

1. Field of the Invention

The present invention relates to an airbag system for a motorcycle, and particularly to an airbag system for a motorcycle in which selected components are configured to be ruptured in a planned way, so as to prevent unpredictable deformation of exterior components.

2. Background Art

A number of motorcycle airbag devices have previously been described, for applying an airbag to a motorcycle by which a rider is effectively restrained when an impact exceeding a predetermined force is applied to a vehicle body. One point where motorcycles largely differ from four-wheeled vehicles is that a rider is not restrained on a vehicle body through a seat beat or the like. In response to this fact, there is a known method in which one end of a support belt, whose other end is fixed to a vehicle body, is coupled to an airbag, and at the time of deployment and expansion of the airbag, the airbag is supported so as to be pulled from the rear side of the vehicle body.

Published Japanese Patent Document JP-A No. 2003-327182 discloses an airbag system in which support belts for an airbag are accommodated in a pair of left and right accommodation grooves passing from a front cover through leg shields, footrest parts, and a rear cover in a scooter-type motorcycle. According to the airbag system described in JP-A No. 2003-327182, since the support belts support the airbag, it is possible to effectively restrain a rider even when yawing and rolling behavior of a vehicle body are large.

SUMMARY OF THE INVENTION

Unlike a four-wheeled vehicle, in which exterior components cover around a driver and passengers, it is preferable for a motorcycle, in which a rider is brought in direct contact with exterior components, to be configured not to generate deformation of the exterior components in the vicinity of the rider, subsequent to an impact applied to a vehicle body. However, a force generated by an impact applied to the vehicle body is likely to be concentrated in the shape such as the accommodation grooves for the support belts. Thus, it is conceivable that, when the accommodation grooves are arranged in the vicinity of a rider, exterior components in the vicinity of the rider are likely to be deformed as a result of airbag deployment. The known art provides no disclosures or suggestions in response to such a problem.

One object of the present invention is to address the above-described problem of the known motorcycle airbag art, and to provide an airbag system for a motorcycle in which selected and predetermined components are configured to be ruptured in a planned way, so as to prevent unpredictable deformation of exterior components.

In order to achieve the above-described object, a first aspect of the present invention is directed to an airbag system for a motorcycle, including belt support members in which support belts for coupling an airbag to a vehicle body are accommodated and covers which cover above the belt support members, the system including: a central cover panel made of resin, as an exterior component, which is arranged on the rear side of a vehicle body while being adjacent to an airbag module in which the airbag is accommodated; and side cover panels made of resin, as a pair of left and right exterior components, which are engaged with the central cover panel outside in the vehicle-width direction. According to the first aspect hereof, each of the belt support members is configured by an overhanging part of the central cover panel which is overhung outside in the vehicle-width direction and an extension part of one of the side cover panels which extends inside in the vehicle-width direction, the overhanging parts are engaged with the extension parts through engaging portions inside the belt support members, and notches formed along the front-rear direction of the vehicle body are provided in the extension parts outside in the vehicle-width direction relative to the engaging portions.

A second aspect of the present invention is a modified version of the airbag system for a motorcycle according to the first aspect hereof, in which the side covers are configured to be removed from the belt support members along with swelling and expansion of the airbag. In this second aspect hereof, plates having wire holding parts to which wires connected to the side covers are coupled are provided; openings where the wire holding parts face outside in the vehicle-width direction are formed in the extension parts of the side cover panels; and the notch is formed at both a lateral end of the extension part on the rear side of the vehicle body and at a lateral end of the opening on the front side of the vehicle body.

According to the first aspect of the invention, a central cover panel made of resin, as an exterior component, is arranged on the rear side of a vehicle body while being adjacent to an airbag module in which the airbag is accommodated, and side cover panels made of resin, as a pair of left and right exterior components, which are engaged with the central cover panel outside in the vehicle-width direction are provided; each of the belt support members is configured by an overhanging part of the central cover panel which is overhung outside in the vehicle-width direction and an extension part of one of the side cover panels which extends inside in the vehicle-width direction; the overhanging parts are engaged with the extension parts through engaging portions inside the belt support members; and notches formed along the front-rear direction of the vehicle body are provided in the extension parts outside in the vehicle-width direction relative to the engaging portions.

Accordingly, even when a force caused by an impact applied to the vehicle body is transmitted to the side cover panels, such a force is concentrated at the notches, thereby preferentially separating the side cover panels and the central cover panel. Accordingly, a force caused by an impact is allowed to escape to the notches which form rupture portions, and it is possible to prevent the deformation of exterior components, which is difficult to predict.

According to the second aspect of the invention, the side cover panels are configured to be removed from the belt support members along with swelling and expansion of the airbag; plates having wire holding parts to which wires connected to the side cover panels are coupled are provided; openings where the wire holding parts face outside in the vehicle-width direction are formed in the extension parts of the side cover panels; and each of the notches is formed at both a lateral end of the corresponding extension part on the rear side of the vehicle body and at a lateral end of the corresponding opening on the front side of the vehicle body. As compared to a configuration in which the notches are provided at both ends of the extension part in the front-rear direction of the vehicle body, a length necessary for rupture can be shortened, and target rupture can be certainly performed with a simple notch shape.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

It should be understood that only structures and methodology needed for illustrating selected embodiments of the present invention are described herein. Other conventional structures, and those of ancillary and auxiliary components of the system, will be known and understood by those skilled in the art.

Figure 1:
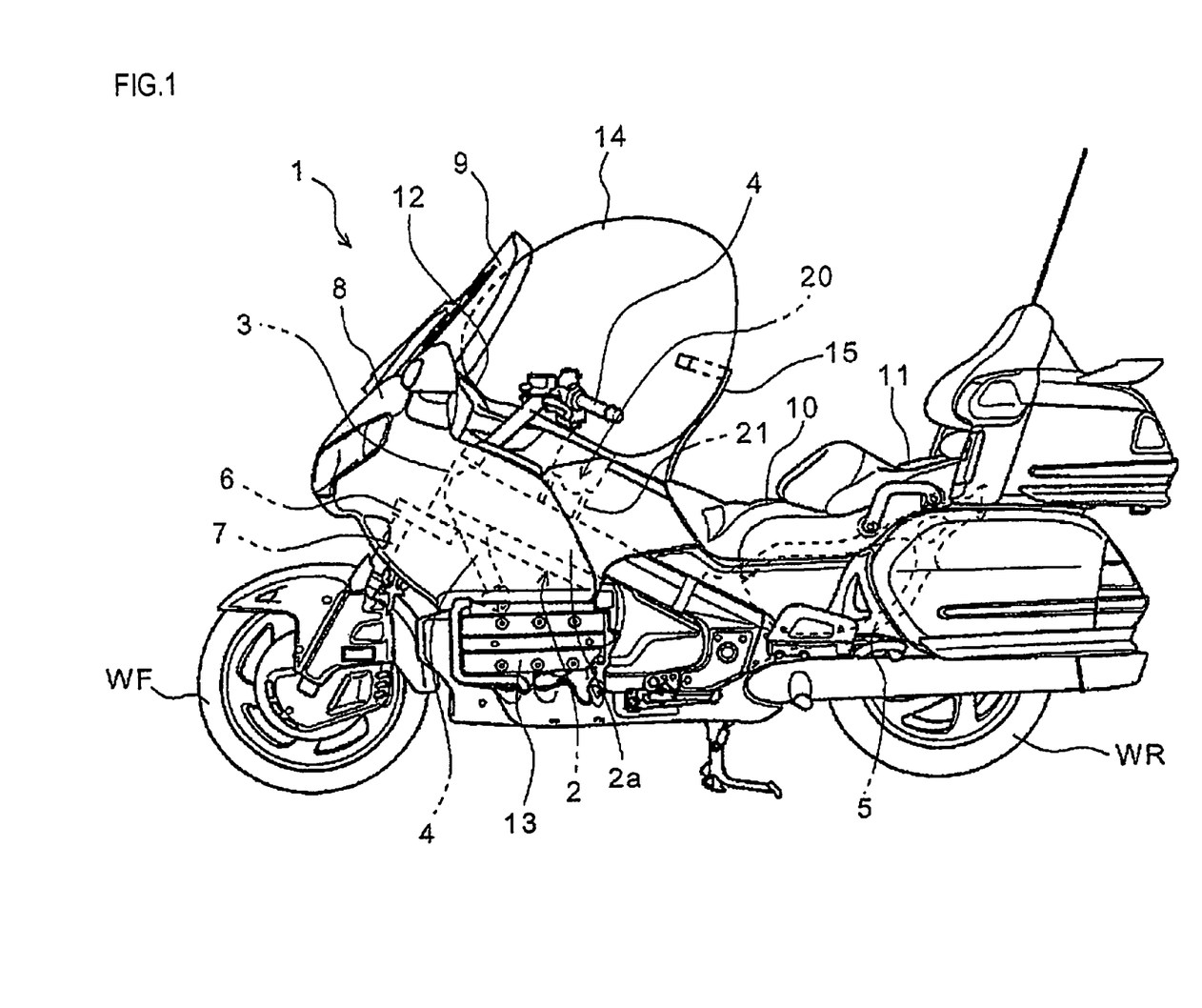
FIG. 1 is a side view of a motorcycle according to a selected illustrative embodiment of the present invention.

Hereinafter, a selected illustrative embodiment of the present invention will be described in detail with reference to the drawings. FIG. 1 is a side view of a motorcycle in which an airbag system according to the illustrative embodiment of the present invention is applied. A frame 2 of a motorcycle 1 is configured mainly by a pair of left and right upper tubes 2a which extend diagonally downward to the rear of a vehicle body from a head pipe 3. A lower tube 4 extends downward from the vicinity of the head pipe 3, and an engine 13, as a driving source, is fixedly suspended from a tip end of the lower tube 4. A pair of left and right front forks 7, which are pivotally steerable with a handlebar 4, are axially supported by the head pipe 3 through a lower bracket 6, and a front wheel WF is rotatably journaled to lower ends of the front forks 7. A seat frame 5 for supporting a main seat 10, a rear seat 11 and the like is connected to the frame 2 on the rear side of the vehicle body, and a rear wheel WR, as a driving wheel, is rotatably journaled to a rear end of a swing arm (not shown) which is swingably coupled to the frame 2.

In the motorcycle 1 according to the depicted embodiment, there is provided an airbag 14 (shown in a deployed configuration in FIG. 1) which, when an impact exceeding a predetermined value is applied to the vehicle body, deploys and expands in a substantially spherical shape. When fully deployed, the airbag 14 extends from an upper side of the main seat 10 to the vicinity of a wind screen 9 attached to an upper end of an upper cowl 8, while being in contact with a instrument panel 12.

An airbag module 20 is provided on an upper portion of the vehicle body for integrally accommodating therein the airbag 14 and an inflator (not shown) therein. When activated, the inflator generates a gas to swell and expand the airbag 14 during deployment thereof. The airbag module 20 is fixed to the upper tubes 2a using a support stay 21 at a forward position of the vehicle body relative to a seated position of a rider. Support belts 15 are also provided, and are coupled to the airbag 14 on the sides of the vehicle body, for effectively restraining a rider while keeping the airbag 14 at an appropriate position. Lower ends of the support belts 15 are tightly fastened to lateral members of the vehicle frame 2 underneath the main seat 10.

Figure 2:
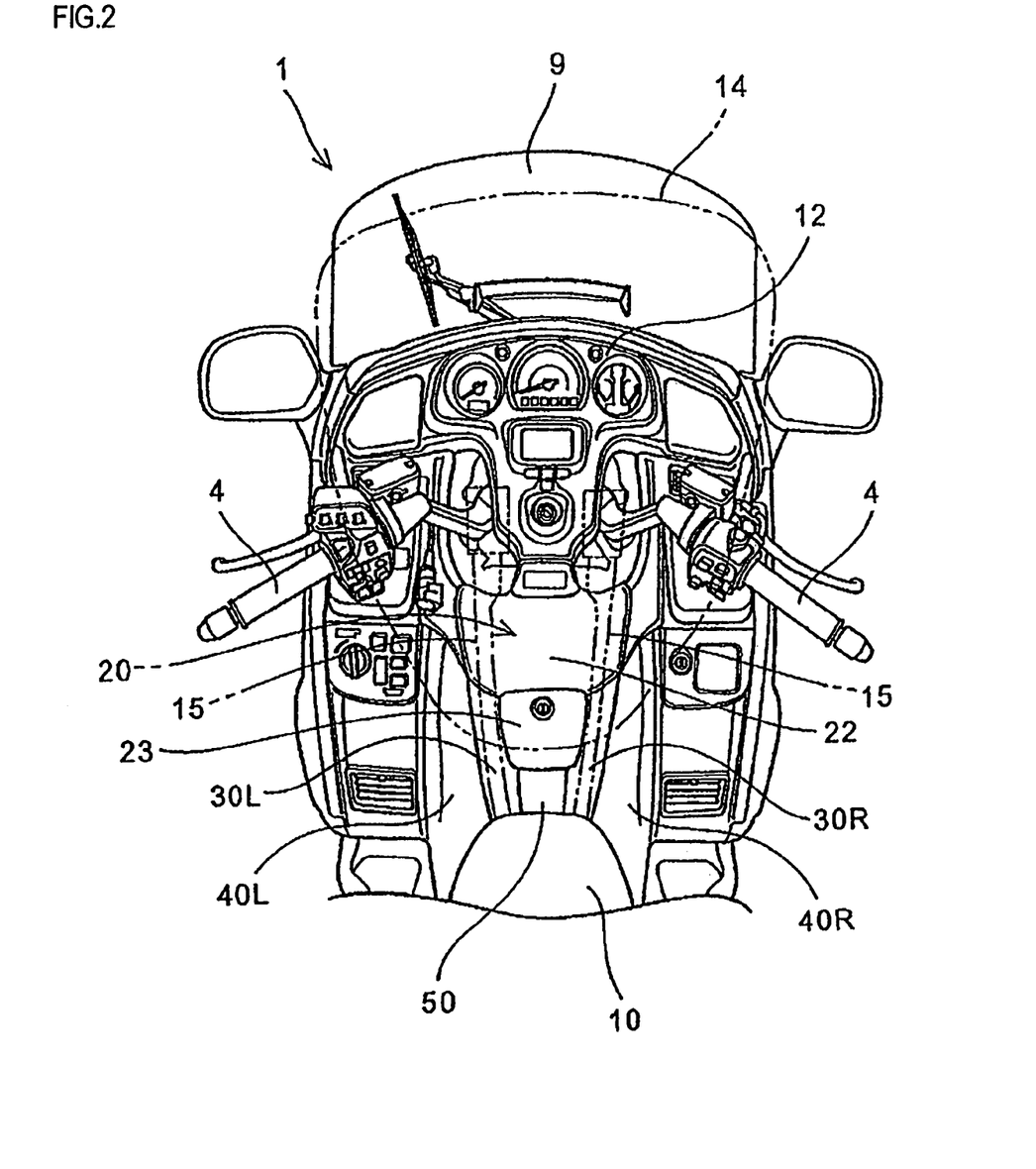
FIG. 2 is a partial top view of the motorcycle of FIG. 1.

FIG. 2 is a partial top view of the motorcycle according to the illustrative embodiment of the present invention. The airbag module 20 is configured in such a manner that the inflator and the folded airbag 14 are accommodated in a box-shaped casing 24 (see FIG. 3), and an upper portion of the airbag module is covered with a module cover 22. The airbag module 20 is arranged between lateral ends of, and in back of the instrument panel 12, as shown. The airbag module 20 is configured in such a manner that when the airbag 14 swells and expands during deployment, by a gas pressure of the inflator which is instantly supplied to the airbag 14, the module cover 22 is allowed to open, with one side thereof serving as a pivot axis on the front side of the vehicle body.

A central cover panel 50 is provided adjacent to the airbag module 20 as an exterior component of the vehicle body. A fuel filler lid 23 is located in a hole formed in the central cover panel 50, and the fuel filler lid is disposed above, and provides access to a fuel tank (not shown). The fuel filler lid 23 is hingedly attached to the central cover panel 50 so as to permit opening thereof.

A pair of left and right belt covers 30L and 30R are arranged on both sides of the central cover panel 50, as belt support members for the respective support belts 15. A pair of left and right side cover panels 40L and 40R (also referred to as side panels herein) are arranged as exterior components outside of the belt covers 30L, 30R in the vehicle-width direction.

The support belts 15 are configured to expand up to the illustrated position shown in FIG. 1 during deployment and expansion of the airbag 14, while forcibly opening the left and right belt covers 30L and 30R. It should be noted that the module cover 22, the belt covers 30L and 30R, the side cover panels 40L and 40R, and the central cover panel 50 are each made of semi-rigid flexible plastic resin material or the like.

It should be noted that the airbag 14 is formed in such a manner that a portion thereof situated between attachment portions for the support belts 15 on both sides of the airbag 14, that is, a middle portion where a rider is held after deployment, is formed in a concave shape having a substantially V-shaped cross section, in order to effectively wrap around a rider when fully expanded. Further, the airbag 14 is not only configured to be supported so as to be stabilized from the rear by the support belts 15, but is also configured to be supported from the front side of the vehicle body by the handlebar 4, the instrument panel 12, and the like.

Figure 3:
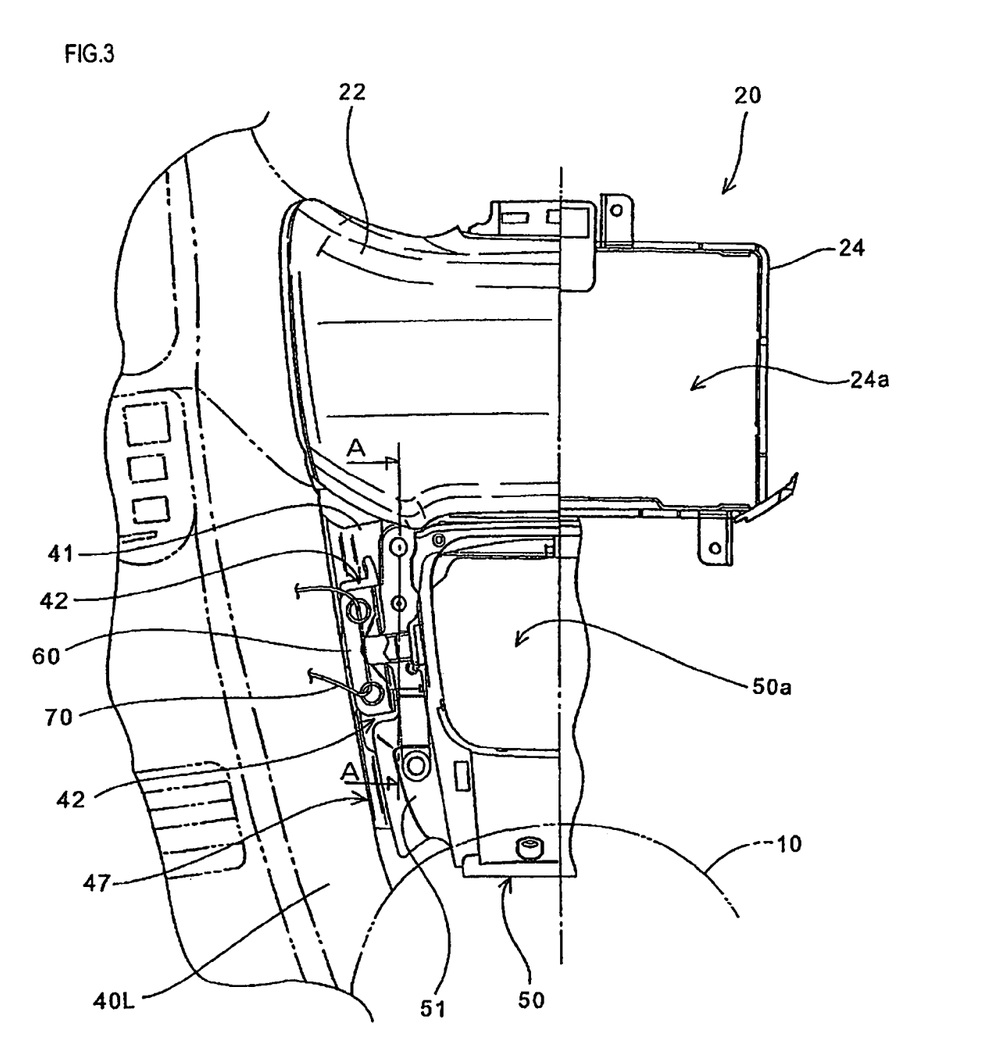
FIG. 3 is a partially enlarged detail view of a portion of FIG. 2.

FIG. 3 is a partially enlarged detail view of a portion of FIG. 2. The left half of the drawing in FIG. 3 shows a state where the left-side belt cover 30L is removed from a belt support member 47 for the support belt 15, and the right half of the drawing shows a state where the module cover 22 of the airbag module 20 has been removed. As described above, the airbag module 20 is configured in such a manner that the folded airbag 14 and the inflator (not shown) are accommodated in the box-shaped casing 24 made of metal or the like, and the casing 24 is covered by the module cover 22.

When the airbag 14 swells and expands during deployment thereof, the module cover 22 opens toward the front of the vehicle body, and the airbag 14 swells and expands from an opening 24a of the casing 24.

The support belts 15 and the belt support members 47 for the support belts 15 have a substantially bilaterally-symmetrical shape. Therefore, the explanation thereof will be made using only the left-side ones, with the understanding that corresponding structure is provided on the right side, which is symmetrical to the described structure of the left.

The belt support member 47 is formed by an extension part 41 of the left-side cover panel 40L, and an overhanging part 51L of the central cover panel 50. A fixation plate 60 is installed at a substantially middle portion of the belt support member 47. A wire 70 is connected to the left-side belt cover 30L, and is also coupled to the fixation plate 60. The fixation plate 60 is arranged so as to face toward the outside of the vehicle, in the vehicle-width direction, from an opening formed in the extension part 41 of the left-side cover panel 40L.

Both ends of the wire 70 which pass through through-holes 66 formed in the fixation plate 60 are connected to the left-side belt cover 30L through wire attachment stays (not shown), thereby coupling the left-side belt cover 30L to the belt support member 47. Therefore, even when the support belt 15 is pulled out and removed from the belt support member 47 along with swelling and expansion of the airbag 14, the left-side belt cover 30L is not moved away from the belt support member 47 over a predetermined length of the wire 70, and a removing range is restricted. Thus, it is possible to prevent the left-side belt cover 30L from dropping off completely from the vehicle body, and from flying off in an unexpected direction.

Figure 4:
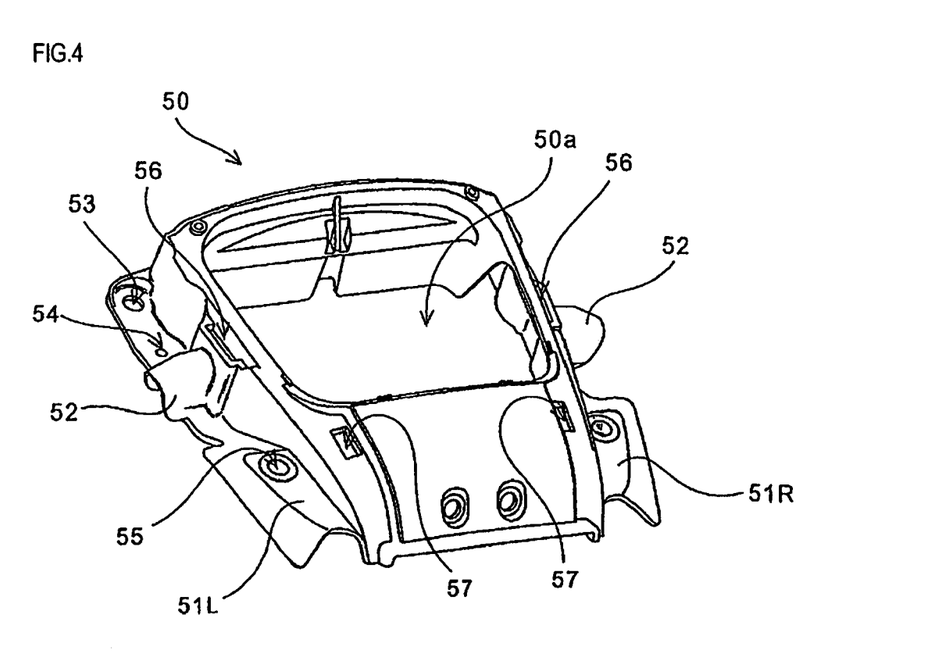
FIG. 4 is a perspective view of a central cover panel according to the illustrative embodiment of the present invention.
Figure 5:
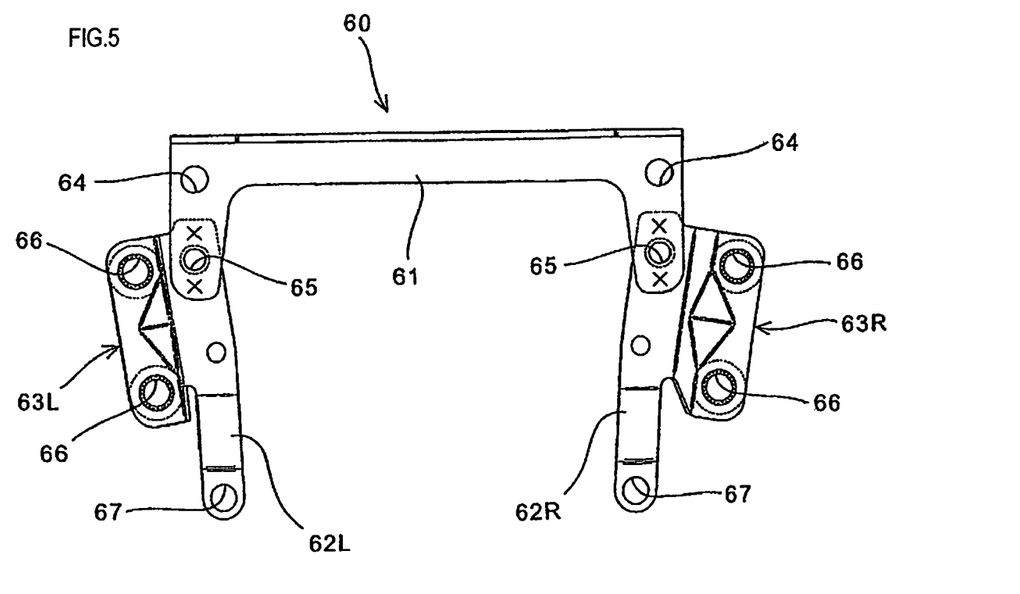
FIG. 5 is a top plan view of a fixation plate which is a component of the airbag system according to the illustrative embodiment.

FIG. 4 is a perspective view of the central cover panel 50, and FIG. 5 is a top view of the fixation plate 60. The central cover panel 50 has a substantially bilaterally-symmetrical shape, as shown, and is integrally molded out of plastic resin or the like. In the central cover panel 50, there are formed: left and right overhanging parts 51L and 51R configuring the belt support members 47; through-holes 53, 54, and 55 used when the central cover panel 50 is fastened to the fixation plate 60 and the side cover panels 40L and 40R; engaging grooves 56 into which stays (not shown) of the belt covers 30L and 30R are inserted; and cylindrical parts 52 adjacent to the engaging grooves 56.

The fixation plate 60 is made of metal similar to the wire 70, which is made of metal such as stainless steel. The fixation plate 60 includes a middle member 61 which is connected by welding to outer members 62L and 62R in which wire holding parts 63L and 63R are formed. In addition to through-holes 65 which are formed at coupling portions between the middle member 61 and the outer members 62L and 62R, through-holes 64 and 67 are formed in the fixation plate 60. The through-holes 64 and 67 are used when the fixation plate 60 is fastened to the central cover panel 50 and the left and right side cover panels 40L and 40R.

Figure 6:
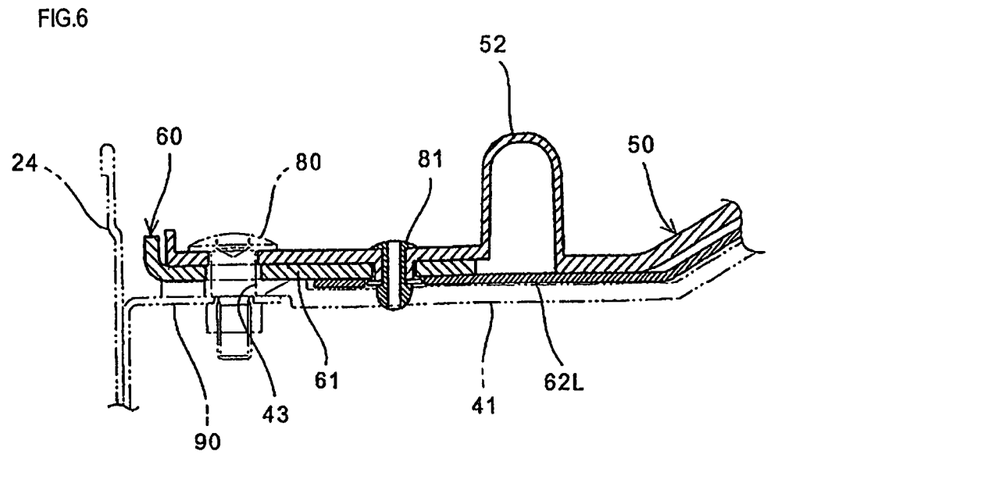
FIG. 6 is a cross sectional view taken along the line A-A of FIG. 3.

FIG. 6 is a cross sectional view taken along the line A-A of FIG. 3. As illustrated therein, a bolt 80 penetrates the through-hole 53 of the central cover panel 50, the through-hole 64 formed in the middle member 61 of the fixation plate 60, a through-hole 43 formed in the extension part 41 of the left-side cover panel 40, and a stay 90 to be coupled to a plate member of the casing 24 on the rear side of the vehicle body, and then is fastened with a nut or the like. A grommet 81 is configured to penetrate the through-hole 54 of the central cover panel 50 and the through-hole 65 formed at the welding-connection portion of the fixation plate 60 so as to fasten the both. With the configuration as described above, the fixation plate 60 is indirectly coupled to the frame 2 of the motorcycle 1, and is stably supported by the vehicle body.

Figure 7:
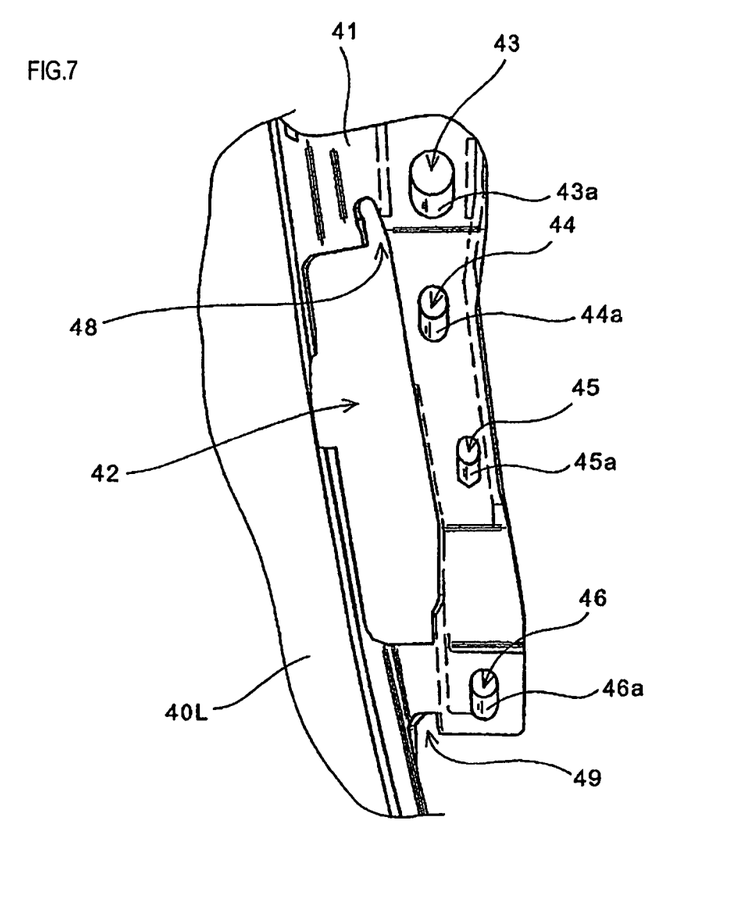
FIG. 7 is an enlarged detail perspective view of an extension part of a side cover panel.

FIG. 7 is an enlarged top view of the extension part 41 of the left-side cover panel 40L. Through-holes 43, 44, 45, and 46 are formed in the extension part 41. Taper parts 43a, 44a, 45a, and 46a extending on the rear side of the vehicle body are formed in the four through-holes, respectively, so as to facilitate assembling work. The extension part 41 according to the illustrative embodiment is characterized in that a notch 49 is formed at a lateral end thereof on the rear side of the vehicle body, and a notch 48 is formed at a lateral end of an opening 42, on the front side of the vehicle body, where the wire holding part 63L of the fixation plate 60 faces.

With reference to FIG. 1 and FIG. 2, when an impact exceeding a predetermined threshold value is applied to the motorcycle 1 from the front side of the vehicle body, the impact is likely to be transmitted to the left and right side cover panels 40L and 40R which are indirectly coupled to the upper cowl 8 and the like. At this time, the airbag module 20 fixed to the frame 2 by a support stay 21 is hardly moved, and accordingly a shear stress and the like are likely to be generated between the side cover panels 40L and 40R, and the central cover panel 50 arranged on the rear side of the vehicle body relative to the airbag module 20. When such a stress is generated between these components, the side cover panels 40L and 40R, and the central cover panel 50 are likely to be unpredictably deformed. However, the side cover panel 40 according to the illustrative embodiment is configured in such a manner that, due to the formation of the notches 48 and 49, the side cover panels 40L and 40R, and the central cover panel 50 are preferentially separated at the notches 48 and 49 when such a stress is generated, so that a stress generated by the impact is absorbed. By performing the target rupture, it is possible to prevent the deformation of exterior components, which is difficult to predict.

In the depicted embodiment, the notches 48 and 49 are formed in a long shape extending in the front-rear direction of the vehicle body, and are directed toward the front side of the vehicle body. Further, the notches 48 and 49 are arranged outside in the vehicle-width direction relative to engaging portions between the through-holes 43, 44, 45, and 46, and the central cover panel 50. Accordingly, when such a stress acts on the side cover panels 40L and 40R, the stress is concentrated at upper portions, in the drawing, of the notches 48 and 49 to cause vertical rupture, so that the both are separated.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. It will be apparent that the shapes of the openings formed in the extension parts, and the number, arrangements and shapes of notches formed in the extension parts and the openings may be variously modified without being limited to the above-described embodiment. For example, thin portions or a plurality of through-holes may be formed in the vicinities of the notches in order to determine target rupture lines. All such modifications, which are within the scope of the claims, are intended to be within the scope and spirit of the present invention.

What is claimed is:

1. An airbag system for a motorcycle, said airbag system comprising:
   an airbag module having an airbag disposed therein;
   a metal fixation plate operatively connected to the airbag module;
   a central cover panel made of resin, as an exterior component, which is arranged on a vehicle body adjacent to the airbag module;
   a pair of left and right exterior side cover panels made of resin, which are engaged with the central cover panel and situated outside of the central cover panel in a vehicle-width direction;
   a support belt for coupling the airbag to the vehicle body; and
   a belt cover which is operatively connected to said fixation plate via a connection member extending therebetween;
   wherein: a belt support member is formed by an overhanging part of the central cover panel which is overhung outside in the vehicle-width direction and an extension part of one of the side cover panels which extends inside in the vehicle-width direction,
   the overhanging part is engaged with the extension part through an engaging portion inside the belt support member, and
   a notch is provided in the extension part disposed laterally outside of the engaging portion, said notch extending substantially in a front-rear direction of the vehicle body.

2. The airbag system for a motorcycle according to claim 1, wherein:
   each of the side cover panels is configured to be removed from the belt support member in response to swelling and expansion of the airbag during deployment thereof;
   said connection member is a wire and said fixation plate comprises a wire holding part to which the wire is connected;
   an opening, where the wire holding part faces outside in the vehicle-width direction, is formed in the extension part of the one side cover panel; and
   the notch is formed at both a lateral end of the extension part on the rear side of the vehicle body and at a lateral end of the opening on the front side of the vehicle body.

3. The airbag system of claim 1, wherein the airbag module comprises a casing which houses the airbag and a module cover disposed above the casing and in front of the central cover member, said module cover adapted to hingedly open during deployment of the airbag.

4. The airbag system of claim 1, comprising another support belt for coupling the airbag to the vehicle body, the support belts are coupled to the airbag on opposite sides of the vehicle body for restraining the airbag in an appropriate position.

5. The airbag system of claim 4, wherein lower ends of the support belts are secured to the vehicle body underneath a seat.

6. The airbag system of claim 1, wherein the central cover panel opens toward a front side thereof when the airbag is deployed.

7. The airbag system of claim 1, wherein the airbag is configured to support a rider after deployment, and when fully deployed, the airbag forms a concave shape having a substantially V-shaped cross section configured to wrap around the rider.

8. The airbag system of claim 7, wherein when the airbag is deployed it is stabilized by the support belt and supported from the front by at least a handlebar and an instrument panel.

9. The airbag system of claim 1, wherein the fixation plate is substantially U-shaped and is fastened to the central cover panel and both of the side cover panels, the fixation plate including another connection member, said connection members being provided on opposite sides of the fixation plate.

10. A motorcycle, comprising a frame, a vehicle body operatively attached to the frame, and an airbag system, the airbag system comprising:
    an airbag module and an airbag disposed within the airbag module;
    a metal fixation plate operatively connected to the airbag module;
    a central cover panel made of resin, as an exterior component, which is arranged on a vehicle body adjacent to the airbag module;
    a pair of left and right exterior side cover panels made of resin, which are engaged with the central cover panel and situated outside of the central cover panel in a vehicle-width direction;
    a support belt for coupling the airbag to the vehicle body; and
    a belt cover which is operatively connected to said fixation plate via a connection member extending therebetween;
    wherein:
    a belt support member is formed by an overhanging part of the central cover panel which is overhung outside in the vehicle-width direction and an extension part of one of the side cover panels which extends inside in the vehicle-width direction,
    the overhanging part is engaged with the extension part through an engaging portion inside the belt support member, and
    a notch is provided in the extension part disposed laterally outside of the engaging portion, said notch extending substantially in a front-rear direction of the vehicle body.

11. The motorcycle according to claim 10, wherein:
    each of the side cover panels is configured to be removed from the belt support member in response to swelling and expansion of the airbag during deployment thereof;
    said connection member is a wire and said fixation plate comprises a wire holding part to which the wire is connected;
    an opening, where the wire holding part faces outside in the vehicle-width direction, is formed in the extension part of the one side cover panel; and
    the notch is formed at both a lateral end of the extension part on the rear side of the vehicle body and at a lateral end of the opening on the front side of the vehicle body.

12. The motorcycle of claim 10, wherein the airbag module comprises a casing which houses the airbag and a module cover disposed above the casing and in front of the central cover member, said module cover adapted to hingedly open during deployment of the airbag.

13. An airbag system for a motorcycle, said airbag system comprising:
    an airbag module having an airbag disposed therein;
    a metal fixation plate operatively connected to the airbag module;
    a central cover panel made of resin, which is arranged on a body of the motorcycle external to the airbag module;
    a pair of left and right exterior side cover panels made of resin, which are engaged with the central cover panel and situated outside of the central cover panel in a motorcycle-width direction;

a pair of support belts for coupling the airbag to the motorcycle body; and a pair of left and right belt covers which are operatively connected to said fixation plate via respective connection members extending between the fixation plate and the belt covers;

wherein:

belt support members are formed by an overhanging parts of the central cover panel which are respectively overhung outside in the motorcycle-width direction and extension parts of the side cover panels which extend inside the overhanging parts in the motorcycle-width direction, the overhanging parts being engaged with the extension parts through engaging portions inside the belt support members, and a notch is provided in each of the extension parts disposed laterally outside of the engaging portions, said notches extending substantially in a front-rear direction of the motorcycle body.

14. The airbag system for a motorcycle according to claim 13, wherein:

each of the side cover panels is configured to be removed from the corresponding belt support member in response to swelling and expansion of the airbag during deployment thereof;

said fixation plate comprises wire holding parts to which wires connected to the belt covers are respectively coupled;

openings, where the wire holding parts face outside in the motorcycle-width direction, are formed in the extension parts of the side cover panels; and each of the notches is formed at both a lateral end of the corresponding extension part on the rear side of the motorcycle body and a lateral end of the corresponding opening on the front side of the motorcycle body.

15. The airbag system of claim 13, wherein the airbag module comprises a casing which houses the airbag and a module cover disposed above the casing and in front of the central cover member, said module cover adapted to hingedly open during deployment of the airbag.

* * * * *